(12) United States Patent
Yagi et al.

(10) Patent No.: US 11,960,711 B2
(45) Date of Patent: Apr. 16, 2024

(54) DISPLAY CONTROL DEVICE, DISPLAY CONTROL METHOD, AND DISPLAY CONTROL PROGRAM

(71) Applicant: Nippon Telegraph and Telephone Corporation, Tokyo (JP)

(72) Inventors: Sayaka Yagi, Musashino (JP); Kimio Tsuchikawa, Musashino (JP); Fumihiro Yokose, Musashino (JP); Takeshi Masuda, Musashino (JP); Yuki Urabe, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/623,019

(22) PCT Filed: Jul. 3, 2019

(86) PCT No.: PCT/JP2019/026540
§ 371 (c)(1),
(2) Date: Dec. 27, 2021

(87) PCT Pub. No.: WO2021/001973
PCT Pub. Date: Jan. 7, 2021

(65) Prior Publication Data
US 2022/0261142 A1  Aug. 18, 2022

(51) Int. Cl.
*G06F 3/04847* (2022.01)
*G06F 3/0482* (2013.01)
*G06Q 10/10* (2023.01)

(52) U.S. Cl.
CPC ....... *G06F 3/04847* (2013.01); *G06Q 10/103* (2013.01); *G06F 3/0482* (2013.01)

(58) Field of Classification Search
CPC .. G06F 3/04847; G06F 3/0482; G06F 3/0486; G06Q 10/103
See application file for complete search history.

(56) References Cited

U.S. PATENT DOCUMENTS

| 7,827,214 B1* | 11/2010 | Ghemawat | G06F 16/1844 707/822 |
| 2011/0170140 A1* | 7/2011 | Naka | G06F 3/1205 358/1.16 |

(Continued)

OTHER PUBLICATIONS

Nakajima et al., "Hybrid Approach on GUI Information Logging Methods for Visualization of Operations in Business Applications," IEICE Technical Report, 2011, 111(279):49-54, 16 pages (with English Translation).

(Continued)

*Primary Examiner* — Jennifer N Welch
*Assistant Examiner* — Ashley M Fortino
(74) *Attorney, Agent, or Firm* — Fish & Richardson P.C.

(57) ABSTRACT

A display control device has display setting information including setting information of a layer structure of display objects on a terminal screen and setting information of a group to which the display objects belong, display state information indicating a display state of the display object, and operation setting information defining which setting content a combination of an operation target and operation content on a screen indicate for a layer structure and a group of display objects for each combination of the operation target and the operation content. The display control device specifies the setting content to the display object based on the combination of the operation target and the operation content, the display state information, and the operation setting information when an operation on the display object occurs. The display control device generates the display state information in which the layer structure of the display objects or the group to which the display objects belong is changed, based on the display setting information and the specified setting content and displays a screen.

6 Claims, 16 Drawing Sheets

(56) References Cited

U.S. PATENT DOCUMENTS

| | | | | |
|---|---|---|---|---|
| 2014/0173477 A1* | 6/2014 | Wang | ............... | G06F 3/0486 |
| | | | | 715/765 |
| 2018/0032956 A1* | 2/2018 | Choi | ............... | H04L 67/10 |
| 2019/0066028 A1* | 2/2019 | Shor | ............... | G06F 3/0482 |

OTHER PUBLICATIONS

Weber, "Folding Methods for Event Timelines in Performance Analysis," 2015 IEEE International Parallel and Distributed Processing Symposium Workshop, May 2015, pp. 205-214.

Yagi et al., "A Visualization Technique of Multiple Window Usage for Operational Process Understanding," IEICE Technical Report, ICM2018-29, Nov. 2018, 118(303):27-32, 14 pages (with English Translation).

* cited by examiner

DISPLAY CONTROL DEVICE, DISPLAY CONTROL METHOD, AND DISPLAY CONTROL PROGRAM

CROSS-REFERENCE TO RELATED APPLICATIONS

This application is a National Stage application under 35 U.S.C. § 371 of International Application No. PCT/JP2019/026540, having an International Filing Date of Jul. 3, 2019, the disclosure of which is considered part of the disclosure of this application, and is incorporated in its entirety into this application.

TECHNICAL FIELD

The present invention relates to a display control device, a display control method, and a display control program.

BACKGROUND ART

Work improvement activities of companies are generally performed in a cycle of "confirmation of work states", "analysis of problems", "review of improvement plans", and "execution and evaluation of improvement plans". In the step of "confirmation of work states", analog work analysis schemes of manual hearing, observation time interval measurement, and the like adopted in many fields have been used in some cases. When such work analysis schemes are used, there is a prejudice toward subjective viewpoints of some workers in addition the work involved. Therefore, there is a problem that, for example, an analysis result depends on individuals or completeness of data is insufficient. As a solution to the above problem, the dependency on individuals can be excluded by acquiring and visualizing operation logs of terminals, and it is possible to confirm work states more efficiently, completely, and finely. Here, as data items acquired as the operation logs, for example, user names, terminal names, application names, window titles, URLs/file paths, window handles, and the like can be considered.

As a virtualization method using such information, for example, a timeline is generally known in which a time point axis is an x axis direction on a screen, an element included in data is disposed in the y axis direction, and a time zone in which each element corresponding to a row on the y axis appears is displayed in a horizontally oblong rectangle. When a timeline is applied to work analysis, for example, an application name or a window title operated by a user is set as an element, and thus a usage situation of a window on a terminal can be analyzed (see NPL 2).

Here, technologies for grouping elements in meaningful units have been proposed to list necessary information so that an analyzer can easily ascertain relevance between the above elements even when many elements are included. As known grouping technologies, for example, there are an approach to hierarchize elements in the same unit of data items or the like (see NPL 1) and an approach to generate a group in any unit based on a rule of using data items as keys (see NPL 2).

CITATION LIST

Non Patent Literature

[NPL 1] M. Weber et al., Folding Methods for Event Timelines in Performance Analysis, In 2015 IEEE International Parallel and Distributed Processing Symposium Workshop, pp. 205-214, May 2015.

[NPL 2] Sayaka Yagi et al., A Visualization Technique of Multiple Window Usage for Operational Process Understanding, IEICE Technical Report, vol. 118, no. 303, ICM2018-29, pp. 27-32, November 2018.

[NPL 3] Hajime Nakajima, Takeshi Masuda, Ikuya Takahashi, "*Gyoumu Apurikësyon Sousa Kasika notameno Haiburiddona GUI Jyoutai no Syutokuhousiki no Teian* (Hybrid Approach on GUI Information Logging Methods for Visualization of Operations in Business Applications)", (Information communication management), IEICE Technical Report, vol. 111, no. 279, pp. 49-54, 2011.

SUMMARY OF THE INVENTION

Technical Problem

However, in the technologies of the related art, uniform grouping methods which are based on data items included in logs have been adopted. Therefore, it is necessary for analyzers to determine units of grouping in advance and it is difficult for analytic viewpoints to be applied to unknown cases. For example, in technologies for hierarchizing the above elements, layer relation between elements cannot be flexibly changed in accordance with analytic purposes. In the technologies for generating groups in any unit described above, it is necessary to determine data items serving as keys of the groups in order to describe setting. When the viewpoints of the groups are unknown, for example, it is effective to perform grouping in accordance with characteristics of logs. Specifically, the grouping in accordance with the characteristics of the logs corresponds to grouping in which elements that account for long time intervals on a timeline are set as a major element group and elements appearing in short time intervals are set as a minor element group, or grouping in which elements containing system names used during certain works are focused on and an element group appearing close in time interval to the elements on a timeline is grouped as the same work.

In work analysis, a purpose of analysis or a viewpoint of a group suitable for the purpose is changed in accordance with a standpoint of an analyzer or a phase of the analysis in some cases. For example, in order to ascertain an operation for each user, it is effective to hierarchize elements in units such as days, weeks, or months for each user at first. On the other hand, in order to analyze a flow of processing for each customer, it is effective to hierarchize elements in units such as identification information of a customer (a customer ID or the like) at first. However, the technologies of the related art may not be applied to usage methods of searching for problem portions in work arising due to various causes while switching layers on a timeline by trial and error and grouping related elements. As a result, there is a problem that it is difficult for an analyzer to perform work analysis using a timeline. Accordingly, the present invention has been devised to solve the foregoing problems and an objective of the present invention is to enable an analyzer to easily perform work analysis.

Means for Solving the Problem

To solve the foregoing problems, according to an aspect of the present invention, a display control device includes: a storage unit configured to store display setting information indicating setting information of a layer structure of display objects on a terminal screen and setting information of a group to which the display objects belong, operation setting information which is indicated by an operation event which is a combination of an operation target and operation content on a screen and indicates setting content related to the layer structure or a group for each combination of the operation target and the operation content, and display state information indicating a disposition position of each of the display objects on the screen; an operation management unit configured to specify the setting content related to the layer structure or the group indicated by the operation event with reference to the display state information and the operation setting information when an operation event on a display object on the screen is received; a generation unit configured to change the setting information of the layer structure or the setting information of the group in the display setting information based on the specified setting content and generate the display state information in which the layer structure of the display objects or the group to which the display objects belong is changed based on the changed display setting information; and a virtualization unit configured to perform screen display based on the generated display state information.

Effects of the Invention

According to the present invention, for example, an analyzer can search for problem portions in work arising due to various causes while switching layers on a timeline by trial and error and grouping related elements. As a result, the analyzer can easily perform work analysis.

DESCRIPTION OF EMBODIMENTS

Hereinafter, a mode for carrying out the present invention (an embodiment) will be described with reference to the drawings. The present invention is not limited to the following embodiment. In the embodiment to be described below, a case in which a display object on a terminal screen is a row object included in a timeline will be described as an example, but the present invention is not limited thereto.

[Configuration]

A configuration of a display control device 10 will be described with reference to FIG. 1. First, operation logs used by the display control device 10 will be described. The operation logs are information indicating terminal information, login user information, information regarding an operation target application of a user on a terminal screen, operation content, and an operation time point. The information regarding the operation target application of the user is, for example, a user name, a terminal name, an application name, a window title, a URL/file path, and a window handle.

The display control device 10 can also acquire display content of an item which is identification information such as a customer ID using a technology (see NPL 3) for acquiring GUI information displayed on a window in addition to these data items and record the identification information as information regarding the operation target application of the user.

In the following description, a "layer" is an aggregation of the same data items or elements belonging to a unit (for example, a group or a period) set by the user among elements included in the operation content of the user indicated in the operation logs or the like. A "group" is an aggregation of any elements in the operation content of the user. A "row object" is an object in which records of which data items are matched other than a time stamp in the operation content logs of the user on a terminal screen are aggregated.

Figure 5:
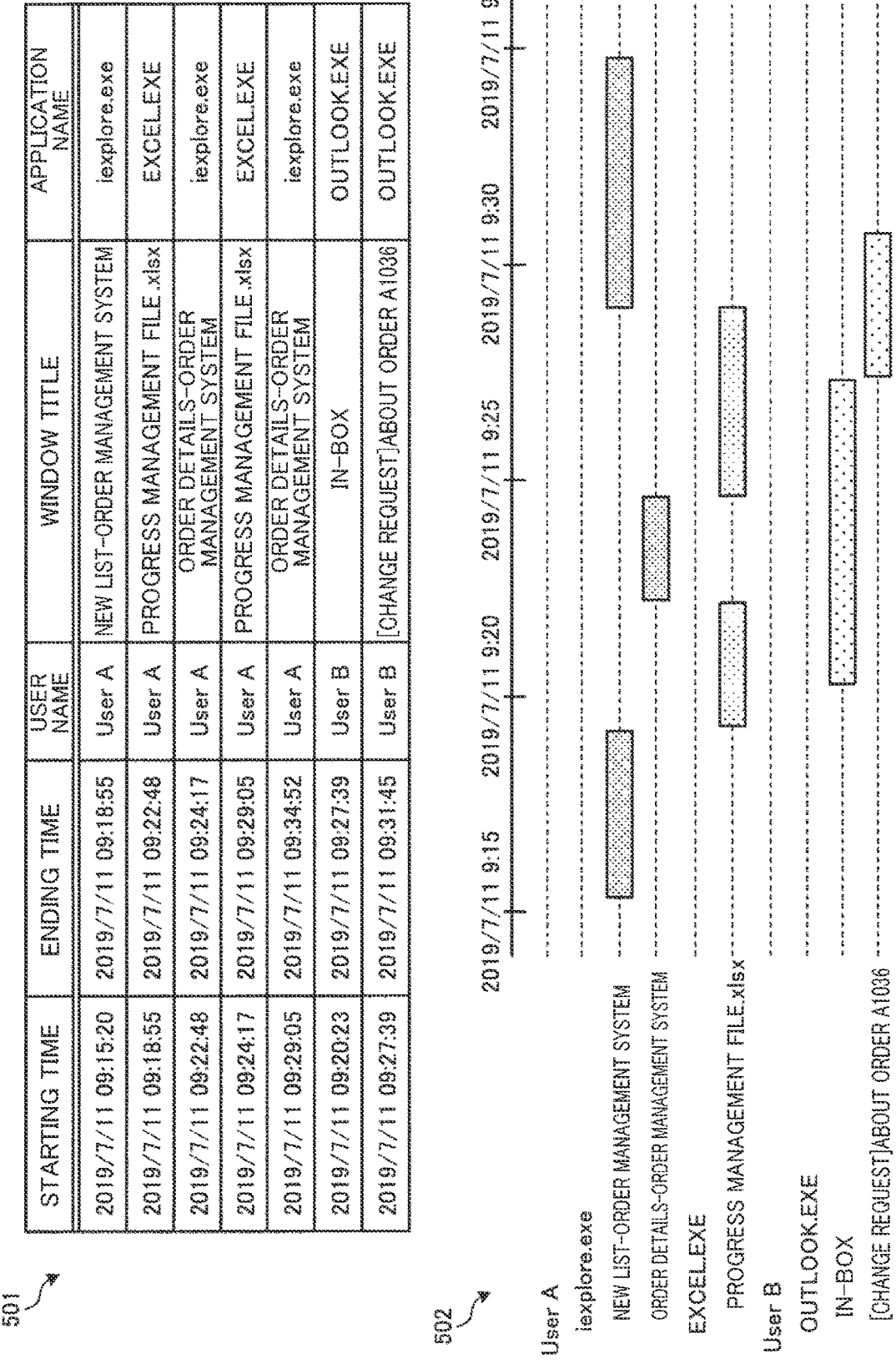
FIG. 5 is a diagram illustrating examples of operation logs and row objects.

For example, as denoted by reference numeral 501 in FIG. 5, the operation log is information indicating, at a timing at which a switching event for a window on the terminal screen, a starting time point and an ending time point of an operation of the user in the window, a user name, a window title of an operation target, an application name used in the window, and the like.

For example, when an input of the operation log in FIG. 5 is received, the display control device 10 generates and displays a user name of the operation, a window title of an operation target, an application name used in the window, and a row object of a timeline indicating a time zone from a starting time point to an ending time point of the operation indicated in the operation log. At this time, the display control device 10 generates and displays a display screen on which each row object is hierarchized or grouped based on a layer relation or a group of the row objects set in advance (see reference numeral 502).

Here, for example, when an input operation of giving an instruction to change setting content of a layer structure or a group of the row objects is received on the display screen from a user (an analyzer), the display control device 10 changes the layer structure of the row objects on the display screen (see FIG. 6) or changes the setting content of the group (see FIG. 13) in response to the instruction.

The display control device 10 includes a display processing unit (a generation unit) 11, an operation management unit 12, a display state management unit 13, and a visualization unit 14. For example, as illustrated in FIG. 1, a user input unit that receives an operation of the user and a screen output unit that outputs a screen are connected to the display control device 10.

The display processing unit 11 changes the setting information of the layer structure of the row object in display setting information (see FIG. 10) or setting information of a group to which the row object belongs based on the setting content of the row object specified by the operation management unit 12. Then, the display processing unit 11 generates display state information (see FIG. 8) in which the layer structure of the row object or the group to which the row object belongs is changed based on the changed display setting information.

Figure 8:
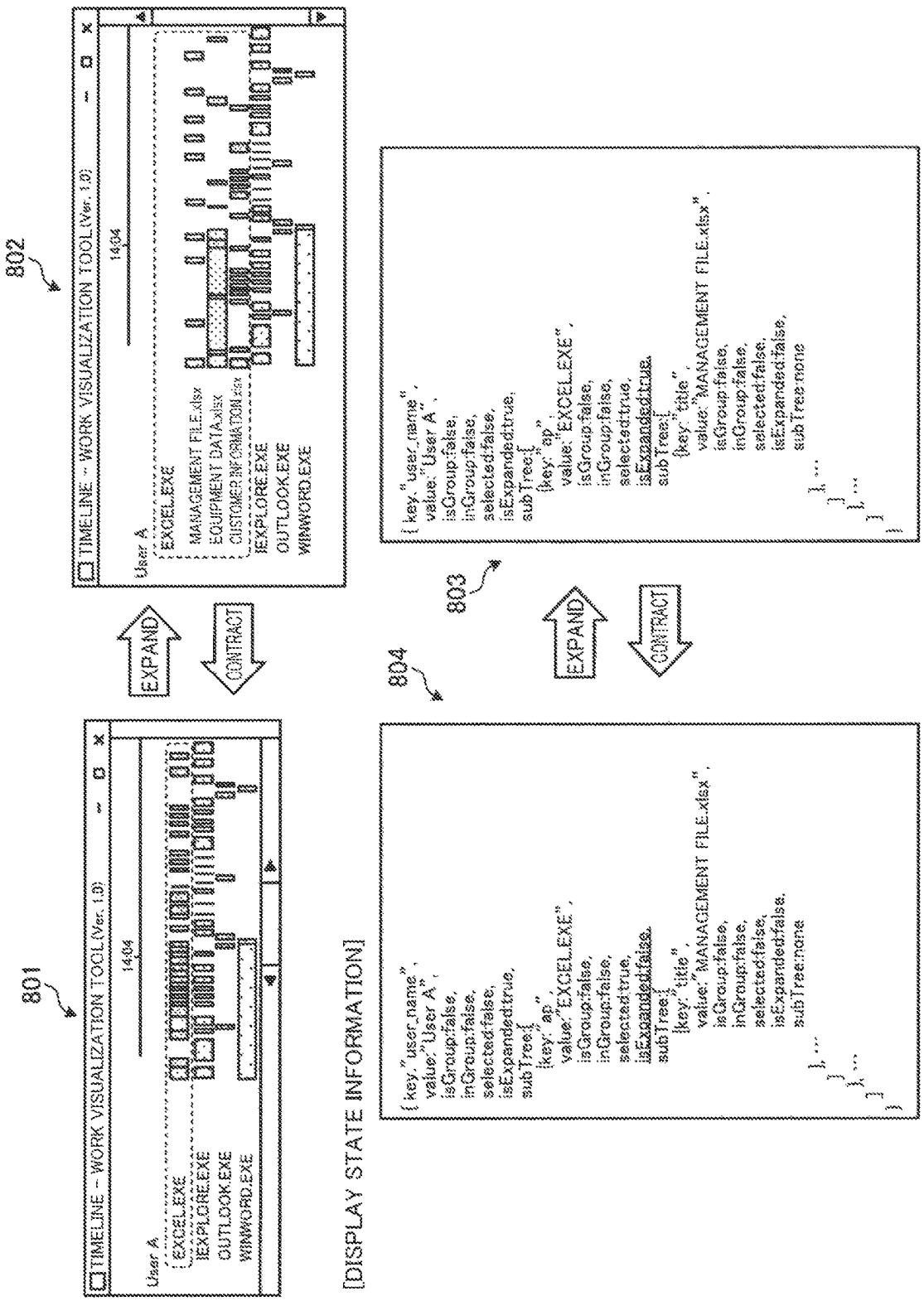
FIG. 8 is a diagram illustrating an example of a layer expansion and contraction screen.

The display state information is information indicating a disposition position of each row object representing the operation content indicated by the operation log on the screen and describes, for example, a display state of the terminal screen of the user in a form such as JSON, as illustrated in the lower part of FIG. 8. The display state information includes information regarding each row object (for example, a data item which is a key of the row object, a value, and whether the row object is a group label (isGroup:true/false), whether the row object is an element in the group (inGroup:true/false), an expanded state of the layer of the row object (isExpanded:true/false), a selection state of the row object (selected:true/false), and the like) in addition to the overall layer structure of the row object. When the display state information is generated, the display processing unit 11 transmits the display state information to the visualization unit 14.

The display setting information is information indicating the setting information of the layer structure of the row object and the setting information of the group to which the row object belongs. For example, in an initial stage, the display setting information is generated based on a display setting file (see FIG. 1) indicating display setting of an initial screen.

Figure 10:
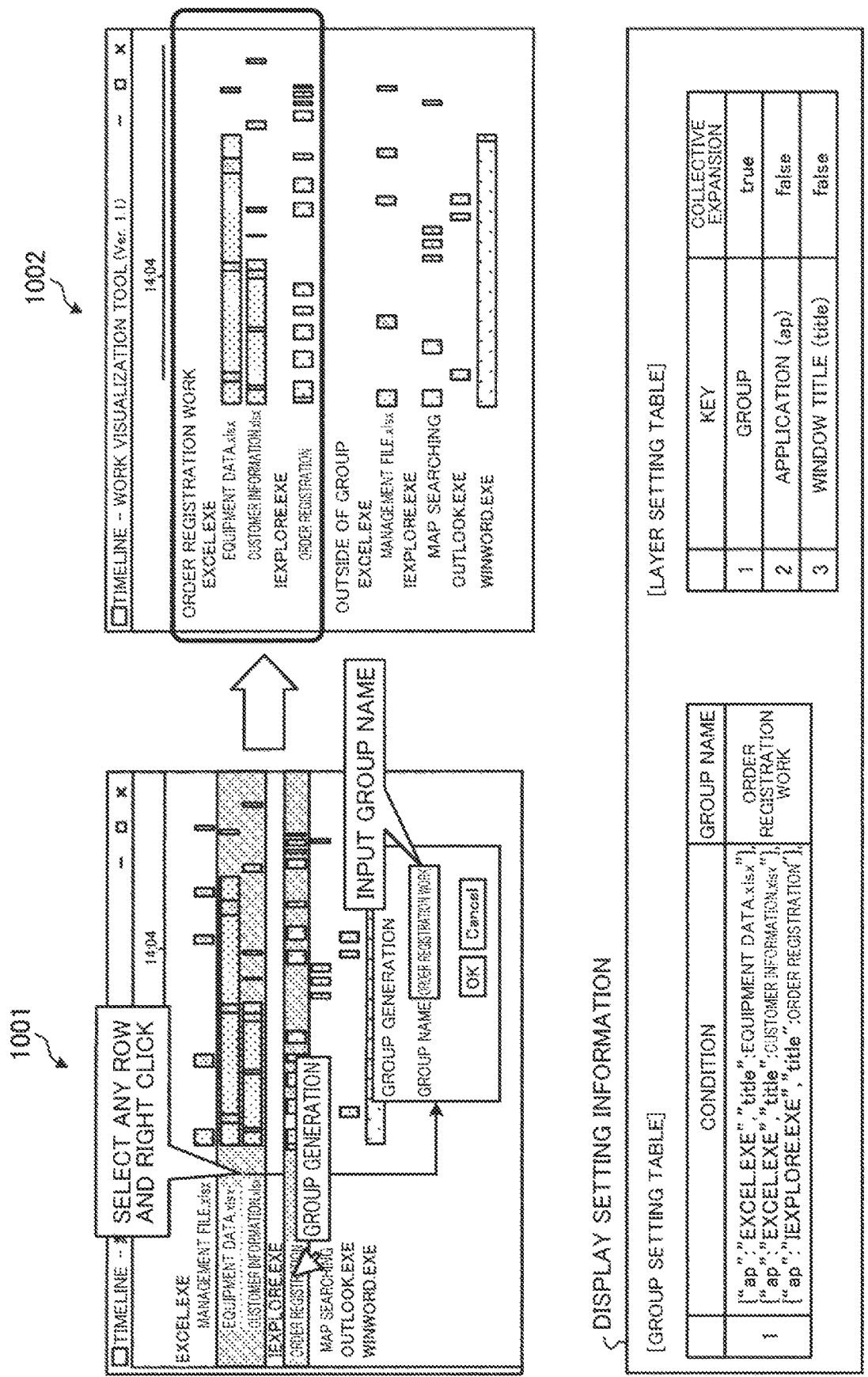
FIG. 10 is a diagram illustrating an example of a screen for setting a group to which row objects belong.

The display setting information includes, for example, a group setting table which is setting information of the group to which the row object belongs and a layer setting table which is setting information of the layer structure of the row object, as illustrated in FIG. 10.

The group setting table is, for example, information indicating a group name and a condition of an object belonging to the group with the group name, as illustrated in FIG. 10. The layer setting table is information indicating a layer to which the element belongs for each data item which is a key of the layer. For example, the layer setting table illustrated in FIG. 10 indicates that a first layer is data, a second layer is an application (ap), and a third layer is a window title (title). As illustrated in FIG. 10, the layer setting table may include information indicating whether each layer is collectively expandable (true/false).

Figure 1:
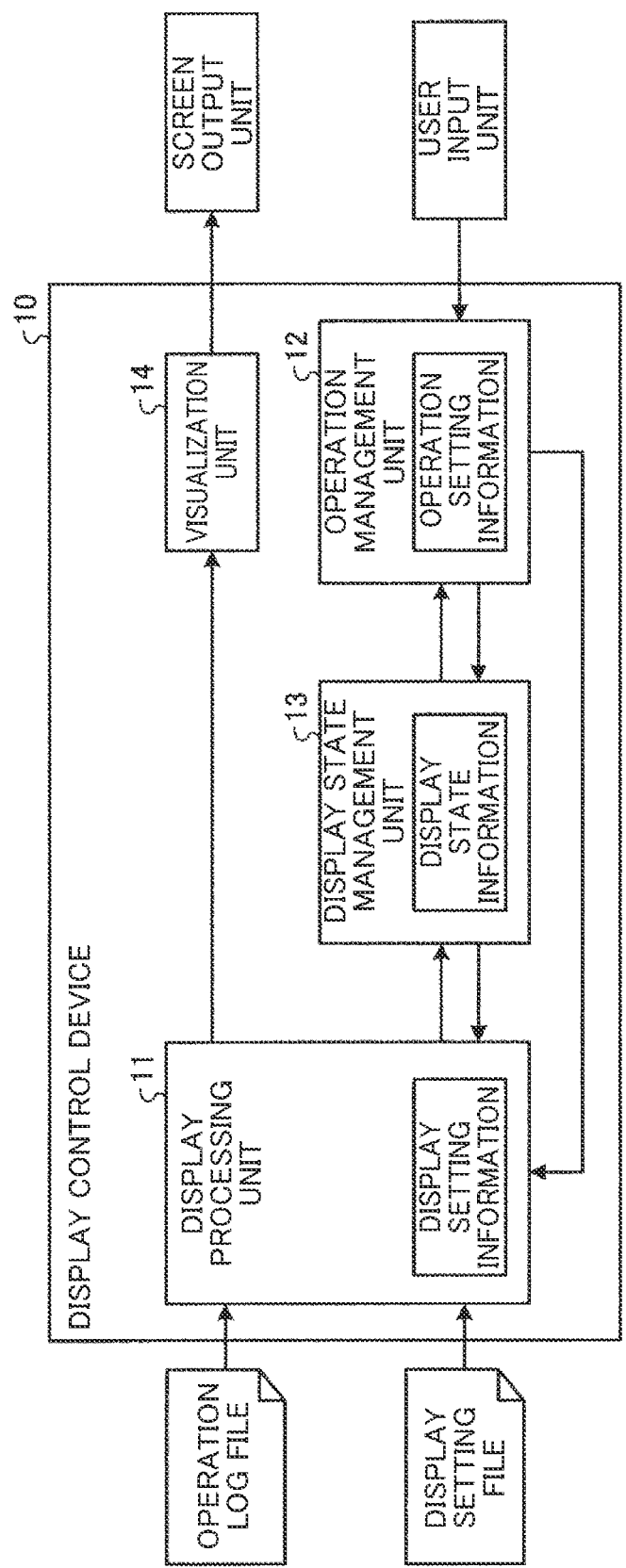
FIG. 1 is a diagram illustrating a configuration example of a display control device.

FIG. 1 is referred back to for description. When an operation event for an object on the screen is received, the operation management unit 12 specifies setting content indicated by a combination of an operation target and operation content of the operation event with reference to the display state information and operation setting information (see FIG. 4). For example, the operation management unit 12 specifies whether the setting content indicated by the received operation event is switch of the layer or a change in a group with reference to the display state information and the operation setting information (see FIG. 4). The operation setting information is information indicating setting content (setting content related to a layer or a group) indicated by a combination of the operation target and the operation content for each combination of the operation target and the operation content for an object.

Figure 4:
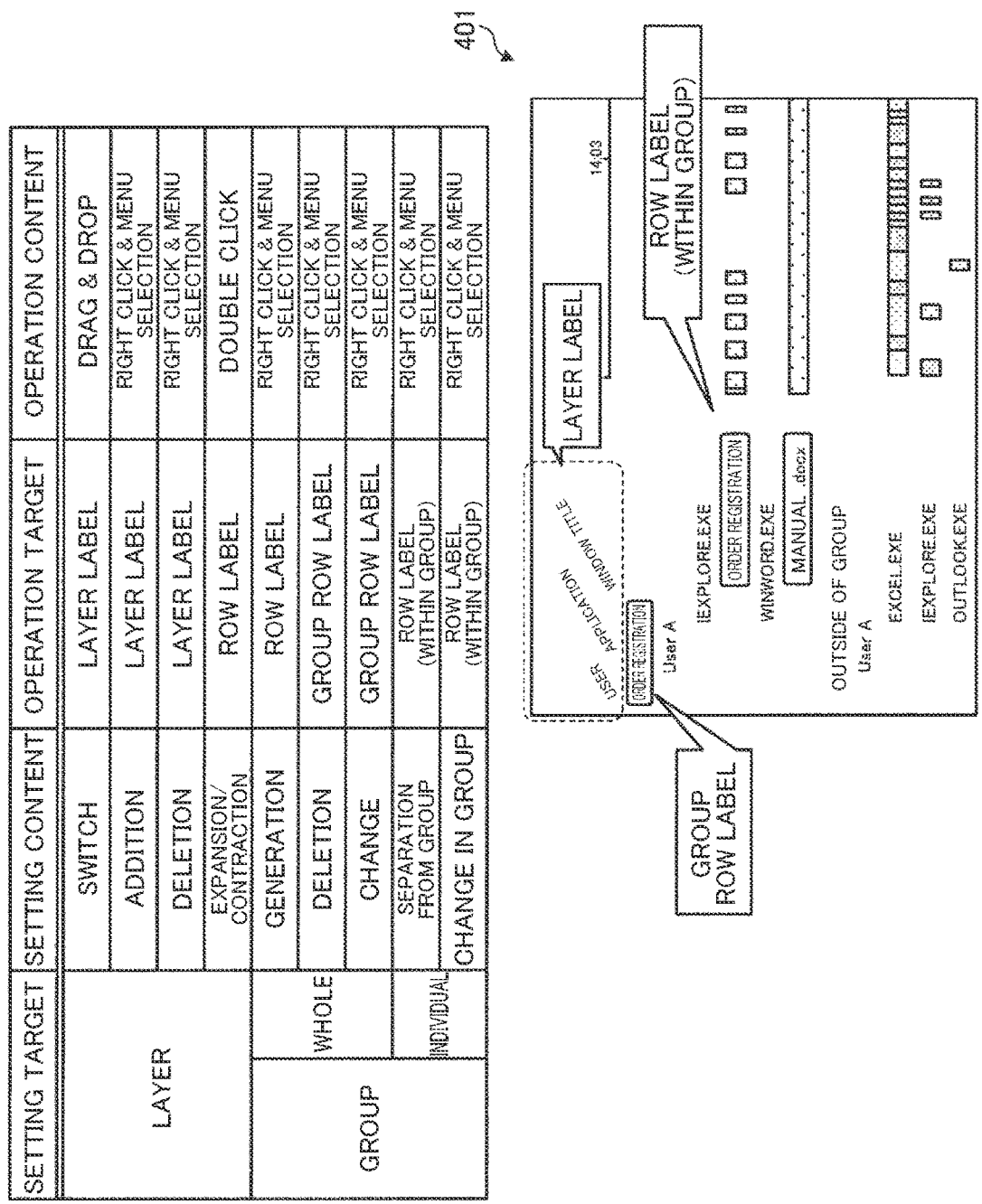
FIG. 4 is a diagram illustrating an example of operation setting information in FIG. 1.

For example, the operation setting information illustrated in FIG. 4, defines which setting content is indicated by a combination of the operation target and the operation content for each combination of the operation target and the operation content. For example, when a drag & drop operation is performed on an object with a layer label on the screen, the operation setting information illustrated in FIG. 4 indicates that the operation is setting content such as switch of a selected layer. An operation target object indicated in the operation setting information illustrated in FIG. 4 is a layer label, a row label (within a group), or a group row label (see reference numeral 401 in FIG. 4) displayed on the screen or a row label assigned to any other row, but another object may be set as an operation target.

The setting content defined in the operation setting information is, for example, switch, addition, deletion, expansion and contraction of a layer, generation, deletion, and a change in a group (whole), separation of a group (individual) from a group, a change in the group, and the like which are illustrated in FIG. 4, but other setting content may be defined.

The display state management unit 13 manages the display state information generated by the display processing unit 11. The visualization unit 14 determines disposition of the row object on the y axis of the timeline based on the display state information generated by the display processing unit 11, determines attribute values of color, transparency, and the like of a rectangle in accordance with the same method as the method disclosed in NPL 2, and generates objects (including a rectangle, a label, an axis, and the like) included in the timeline. The visualization unit 14 outputs the generated results to a screen output unit such as a display.

The above-described display setting information, display state information, and operation setting information are stored in a storage device (a storage unit) such as a memory or a hard disk included in the display control device 10.

[Processing Order]

Next, processing in a case in which the display control device 10 receives an input operation of giving an instruction to change display of the row objects on the screen from the user will be described with reference to FIGS. 2 and 3.

Figure 2:
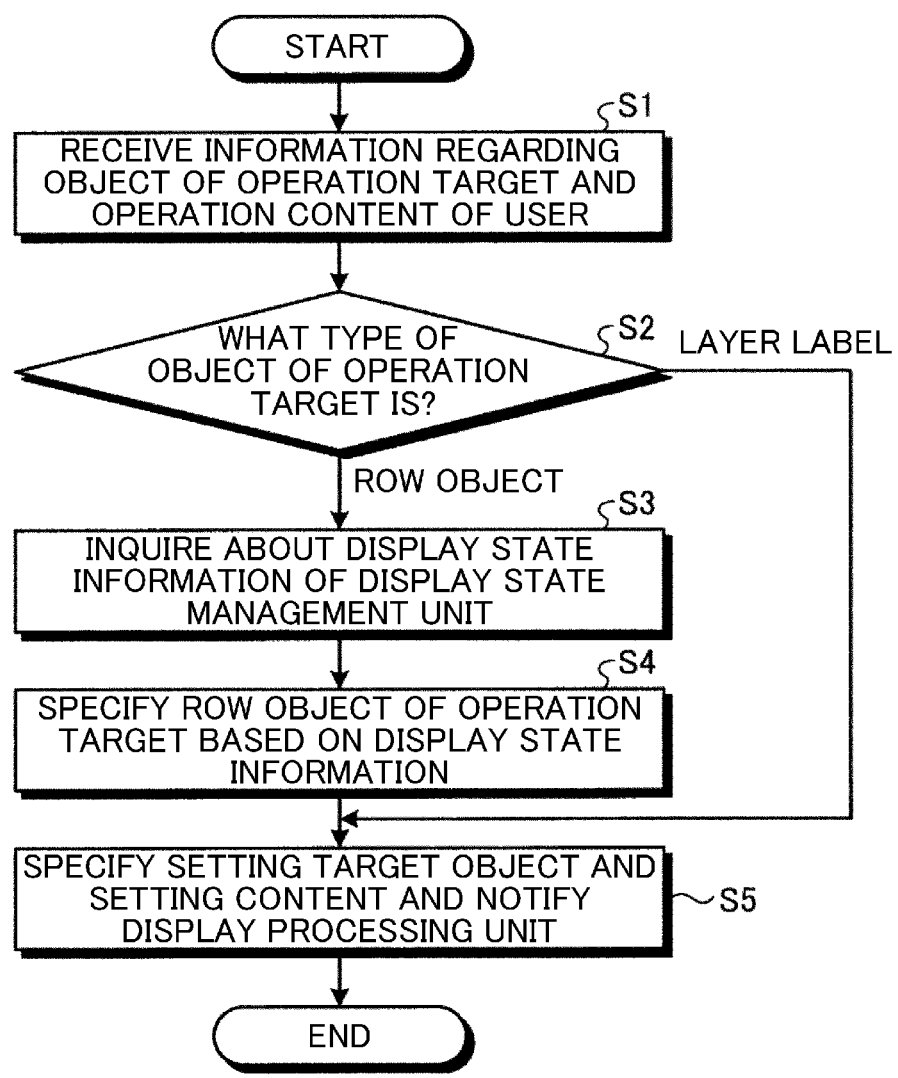
FIG. 2 is a flowchart illustrating an example of a processing order of an operation management unit in FIG. 1.
Figure 3:
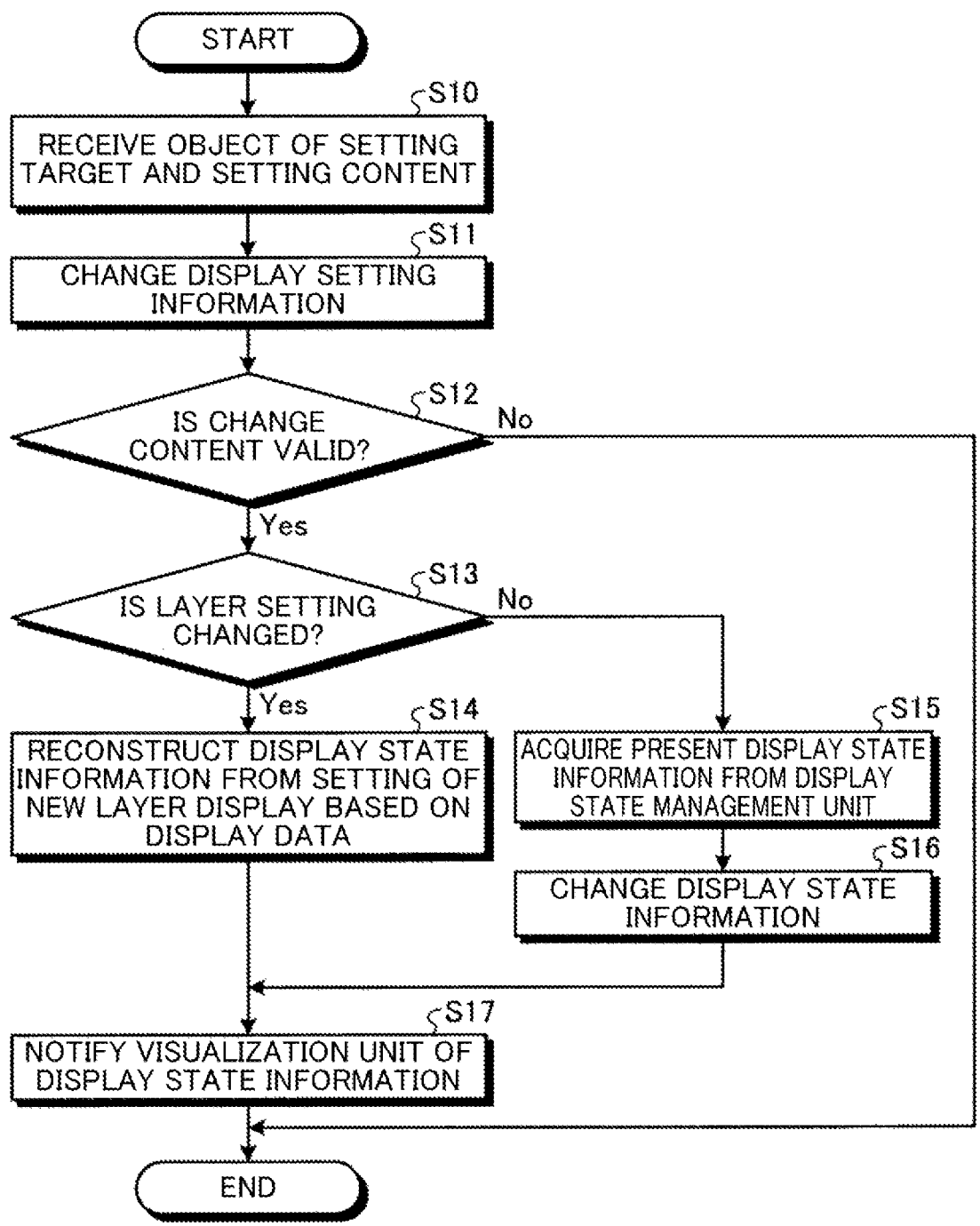
FIG. 3 is a flowchart illustrating an example of a processing order of a display processing unit in FIG. 1.

First, for example, when the user input unit receives the input operation of giving an instruction to change the display of the row object on the screen from the user through a mouse, a keyboard, or the like, the operation management unit 12 receives information regarding an object of an operation target and operation content of the user from the user input unit (S1 of FIG. 2). Subsequently, based on the information received in S1, the operation management unit 12 determines whether the type of object of the operation target is a row object or a layer label (S2). Here, when the operation management unit 12 determines that the type of object of the operation target is the row object ("row object" in S2), the operation management unit 12 inquires about the display state information of the display state management unit 13 (S3).

After S3, the operation management unit 12 specifies the row object of the operation target based on the display state information obtained as a result of the inquiry (S4). For example, the operation management unit 12 specifies the selected row object based on a selection state and an expanded state of the display state information. Thereafter, based on the operation setting information (see FIG. 4), the operation management unit 12 specifies the object of the setting target and the setting content and notifies the display processing unit 11 of the object of the setting target and the setting content (S5). Conversely, when the operation management unit 12 determines in S2 that the type of object of the operation target is the layer label ("layer label" in S2), the processing proceeds to S5.

Here, the processing of S4 will be described in detail. For example, the operation management unit 12 prepares for an object or an array (for example, keyChain) for storing the layer structure of the row objects, and then searches for each row object included in the display state information in order. When there is the row object in an expanded state and an unselected state, a key and a value of the row object are added to the above keyChain. When there is a row object in an unexpanded state and a selected state as a result of the searching of each row object, the operation management unit 12 regards the row object as an operation target and adds the key and value of the row object to keyChain.

For example, when the display state information is exemplified in FIG. 8, the operation management unit 12 performs the following process.

(1) Since the key is "user_name" and the value is the row object of "User A" which is in the expanded state and the unselected state of the row object, the operation management unit 12 adds the key and the values to keyChain. (keyChain: {"user_name": "User A"})

(2) Since the key is "ap" and the value is the row object of "EXCEL.EXE" which is in the unexpanded state and the selected state, the operation management unit 12 adds the key and value to keyChain. (keyChain: {"user_name": "User A", "ap": "EXCEL.EXE"})

The operation management unit 12 notifies of the object described in keyChain generated through the processing until the above (2) as the object of the setting target.

Subsequently, when setting content and the object of the setting target notified of by the operation management unit 12 is received (S10 of FIG. 3), the display processing unit 11 changes the display setting information based on the setting content and the object of the setting target (S11).

Here, the display processing unit 11 determines that change content of the display setting information in S11 is valid (Yes in S12), the processing proceeds to S13. Then, the display processing unit 11 determines whether the change in the display setting information is a change in the layer setting of the display setting information (S13). Here, when the display processing unit 11 determines that the change in the display setting information is the change in the layer setting (Yes in S13), the display processing unit 11 reconstructs the display state information based on display data and the layer setting in the changed display setting information (S14: the display state information is reconstructed from setting of new layer display based on the display data). Then, the display processing unit 11 notifies the visualization unit 14 of the display state information reconstructed in S14 (S17). When the display processing unit 11 determines in S12 that the change content of the display setting information in S11 is invalid (No in S12), the processing ends.

Conversely, when the change of the display setting information in S12 is not the change in the layer setting of the display setting information (No in S13), the display processing unit 11 acquires present display state information from the display state management unit 13 (S15). Then, the display state information is changed (S16). For example, when the change in the display setting information in S11 is the change in the setting of the group in the display setting information, the display processing unit 11 acquires the present display state information from the display state management unit 13. Then, the display processing unit 11 changes the acquired display state information based on the changed display setting information and notifies the visualization unit 14 of the changed display state information (S17).

In this way, the display control device 10 can change the display of the row objects on the screen in response to an operation from the user (the analyzer).

When a large change is necessary for the display state information like a change in the layer or the like, the display processing unit 11 reconstructs the display state information and notifies the visualization unit 14 of the reconstructed display state information. Conversely, when a large change is unnecessary for the display state information like a change in the group to which the row objects belong, the display processing unit 11 changes the present display state information and notifies the visualization unit 14 of the changed display state information.

That is, as described above, the display state information includes information regarding the overall layer structure of the row objects and an expanded state or a selected state of the layer structure. Thus, for example, for an operation of which display is not considerably changed before and after the operation of the user, such as a change in the group to which the row objects belong or expansion of the layer, the display processing unit 11 may partially update the display state information. As a result, for an operation of which a considerable change is unnecessary in the display state information, such as a change in the group to which the row objects belong or expansion of the layer, the display processing unit 11 can quickly notify the visualization unit 14 of display state information in which the operation content is reflected.

Next, a screen example in a case in which the display control device 10 receives an input operation of giving an instruction to change display of the row objects on the screen from the user will be described with reference to FIGS. 6 to 15.

[Switch of Layer]

First, a screen example in a case in which the display control device 10 receives an input operation of giving an instruction to switch the layer (to change an order of hierarchization) from the user will be described with reference to FIG. 6.

Figure 6:
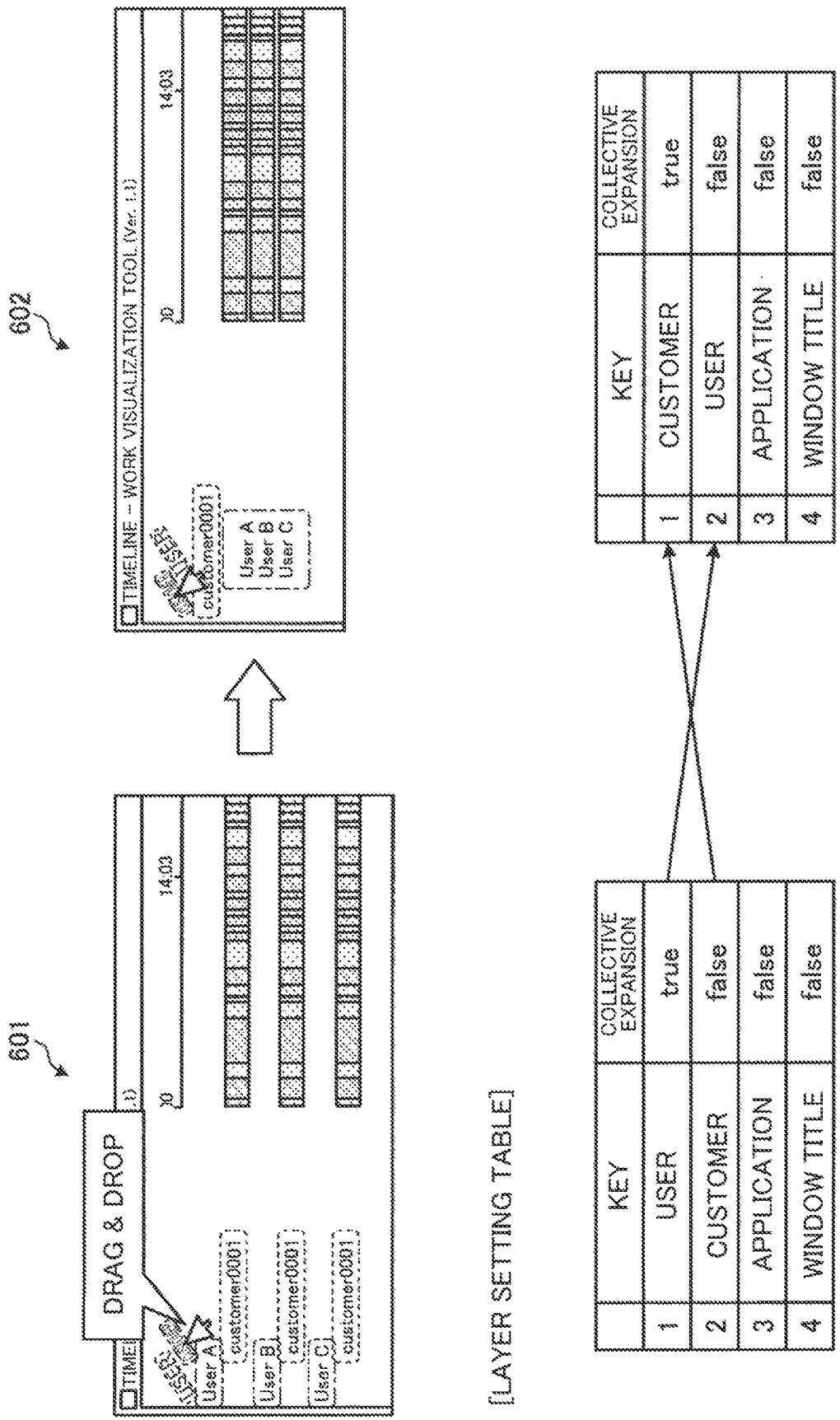
FIG. 6 is a diagram illustrating an example of a layer switching screen.

For example, a case in which the display control device 10 receives an operation indicating drag and drop of an object with a layer label displayed on the screen from the user, as denoted by reference numeral 601 of FIG. 6 will be considered. In this case, the operation management unit 12 specifies switch of a layer with a layer name indicated by the object which is the setting content indicated by the operation based on the operation setting information (see FIG. 4). Then, the display processing unit 11 changes the layer setting (the layer setting table) in the display setting information based on the specified setting content. Thereafter, the display processing unit 11 reconstructs the display state information based on the changed display setting information.

For example, when the specified setting content is the switch of the layer of "user" and the layer of "customer", the display processing unit 11 switches layer of "user" and the layer of "customer" in the layer setting table, as illustrated in FIG. 6. Then, the display processing unit 11 reconstructs the display state information in which the layer of "user" is disposed below the layer of "customer" based on the layer setting table in which the layers are switched. Based on the reconstructed display state information, the visualization unit 14 draws the screen in which the layer of "user" is disposed below the layer of "customer", as denoted by reference numeral 602 of FIG. 6.

When the display control device 10 displays the forgoing screen, the user (the analyzer) can easily perform work analysis of work in which a plurality of users are involved in a single customer in a customer unit, for example.

[Addition and Deletion of Layer]

Next, a screen example in a case in which the display control device 10 receives an input operation of giving an instruction to add or delete a layer from the user will be described with reference to FIG. 7.

Figure 7:
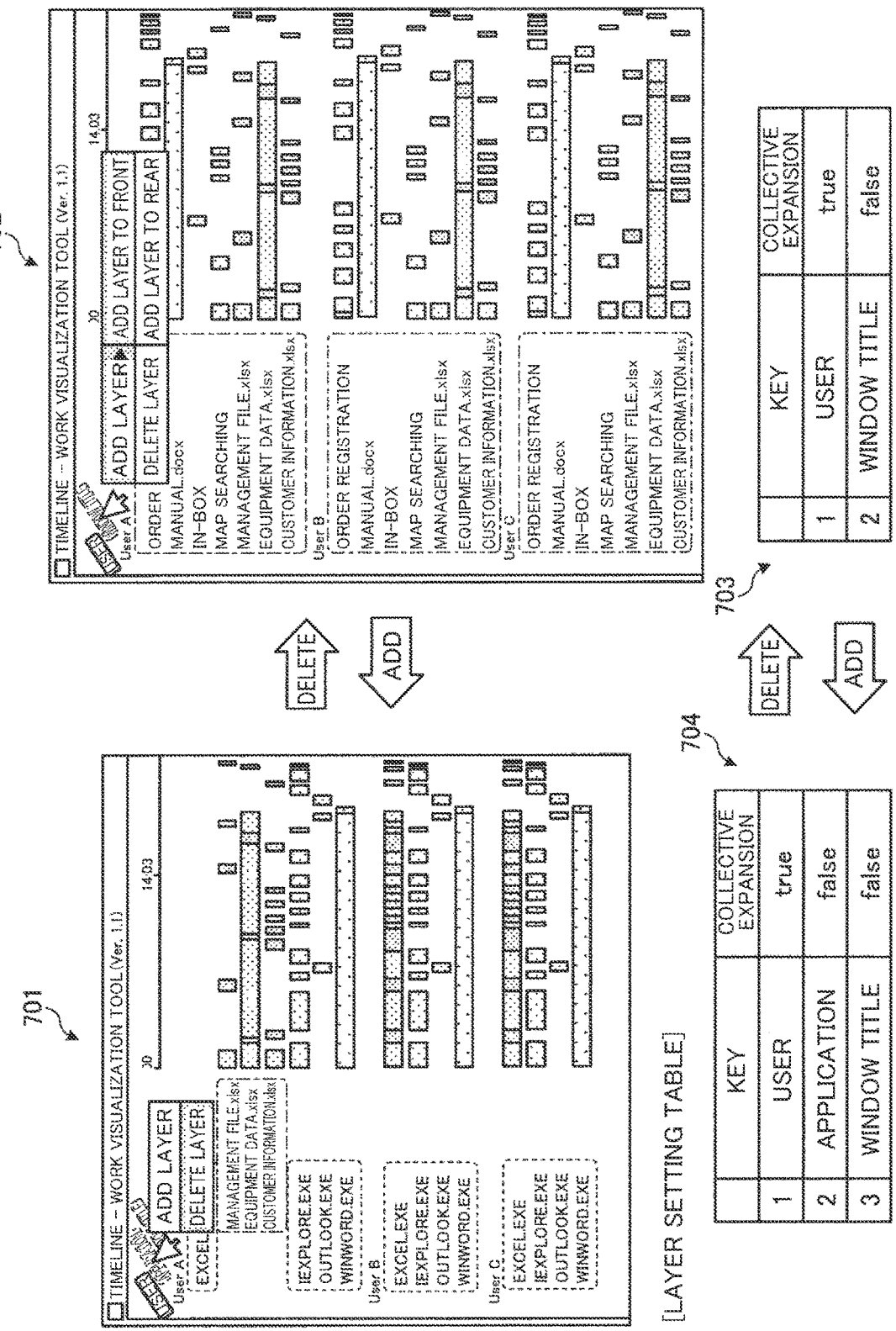
FIG. 7 is a diagram illustrating an example of a layer addition and deletion screen.

For example, a case in which the display control device 10 receives selection of "deletion" with a right click of an object with a layer label of "application" displayed on the screen and menu selection from the user will be considered, as denoted by reference numeral 701 of FIG. 7. In this case, the operation management unit 12 specifies deletion of the layer with the layer name indicated by the object which is the setting content indicated by the operation based on the operation setting information (see FIG. 4). Then, the display processing unit 11 changes the layer setting (the layer setting table) in the display setting information based on the specified setting content. Thereafter, the display processing unit 11 reconstructs the display state information based on the changed display setting information.

For example, when the specified setting content is deletion of the layer of "application", the display processing unit 11 deletes the layer of "application" from the layer setting table in the display setting information, as denoted by reference numeral 703 of FIG. 7. Then, the display processing unit 11 reconstructs the display state information in which the layer of "application" between the layer of "user" and the layer of "window title" is deleted based on the layer setting table. Based on the reconstructed display state information, the visualization unit 14 draws a screen on which the window title of the window used by the user with a user name is disposed in the layer below the display of the user name, as denoted by reference numeral 702 of FIG. 7.

For example, a case in which the display control device 10 receives a right click of an object with a layer label of "application" displayed on the screen and selection of "add" in the menu selection from the user will be considered, as denoted by reference numeral 702 of FIG. 7. In this case, the operation management unit 12 specifies the setting content indicated by the operation which is addition of the layer with the layer name indicated by the object based on the operation setting information (see FIG. 4). Then, the display processing unit 11 adds the layer of "application" between the layer of "user" and the layer of "window title" of the layer setting table in the display setting information, as denoted by reference numeral 704 of FIG. 7. Then, based on the layer setting table, the display processing unit 11 reconstructs the display state information in which the layer of "application" is added between the layer of "user" and the layer of "window title" of the layer setting table. Based on the reconstructed display state information, the visualization unit 14 disposes the application name in the layer below the display of the user name and draws a screen in which the window title name is disposed further below the layer, as denoted by reference numeral 701 of FIG. 7.

[Expansion and Contraction of Layer]

Next, a screen example in a case in which the display control device 10 receives an input operation of giving an instruction to expand or contract a layer from the user will be described with reference to FIG. 8. The expansion of the layer means that a target layer is expanded and an element (a value of a data item) included in the layer is displayed. The contraction of the layer means that a target layer is folded and only a layer name is displayed.

For example, a case in which the display control device 10 receives an operation indicating a double click of an object with a row label on a screen denoted by reference numeral 801 of FIG. 8 from the user will be considered. In this case, the operation management unit 12 specifies the setting content indicated by the operation which is the expansion of the layer to which the object with the row label belongs based on the operation setting information (see FIG. 4). Then, the display processing unit 11 changes the display state information, as denoted by reference numeral 803 of FIG. 8. Based on the changed display state information, the visualization unit 14 draws a screen on which the layer below the selected object of the row label is expanded, as denoted by reference numeral 802 of FIG. 8.

The display control device 10 receives an operation indicating a double click of the object with the row label on the screen denoted by reference numeral 802 of FIG. 8 from the user. Then, the operation management unit 12 specifies the setting content indicated by the operation which is contraction of the layer to which the object with the row label belongs based on the operation setting information (see FIG. 4). Then, the display processing unit 11 changes the display state information, as denoted by reference numeral 804 of FIG. 8. Based on the changed display state information, the visualization unit 14 draws a screen in which the layer below the selected object with the row label is contracted, as denoted by reference numeral 801 of FIG. 8.

Figure 9:
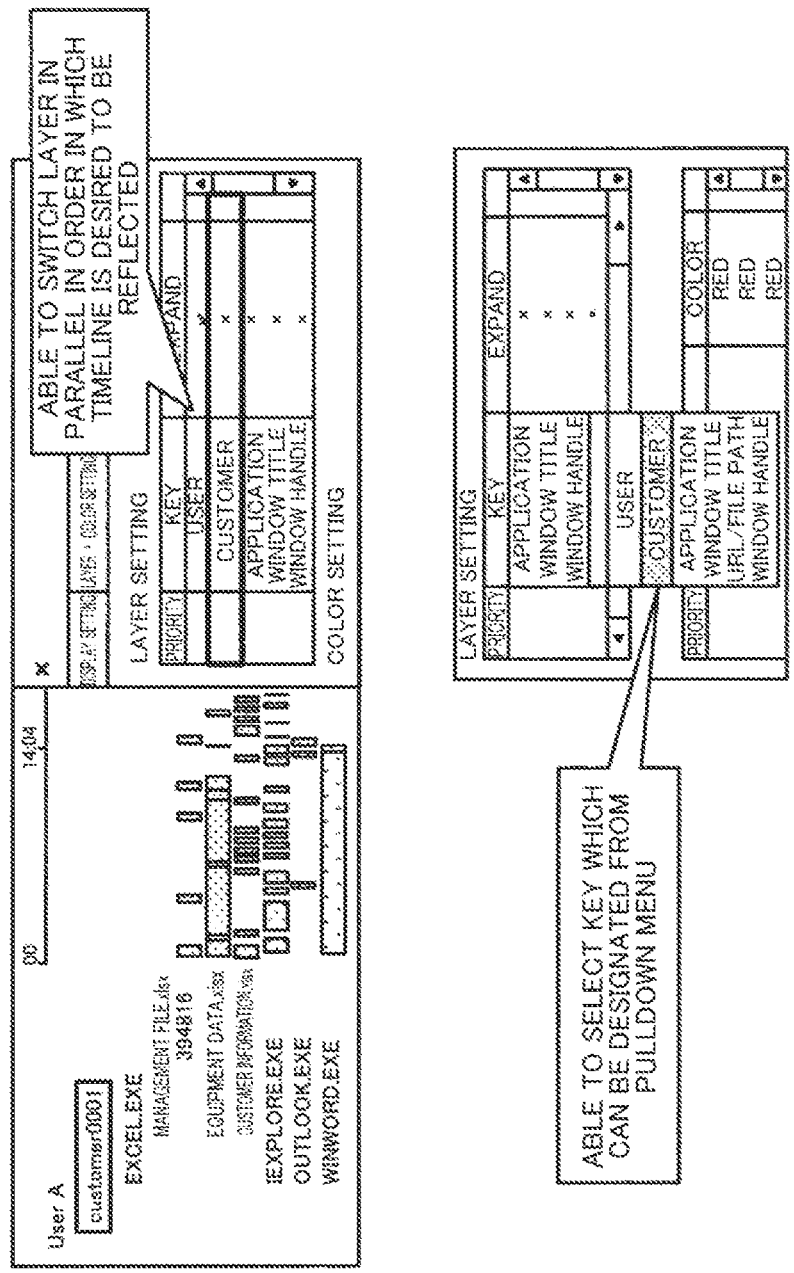
FIG. 9 is a diagram illustrating an example of a layer setting screen.

The input operation of giving an instruction to change the layer may be received from, for example, a setting screen illustrated in FIG. 9. For example, as illustrated in FIG. 9, the display processing unit 11 may prepare a screen on which layer setting to which a data item (key) belongs is performed and may be able to change the layers in parallel in order in which the timeline (the row object) is desired to be reflected from the screen. A key which can be designated may be selected from, for example, a pulldown menu or the like on the above screen.

As described above, the display control device 10 performs the display control of switch, addition, deletion, expansion, and contraction of the layer on the screen based on an operation of the user (the analyzer), and thus the user can easily perform work analysis from various viewpoints.

[Generation of Group]

A screen example in a case in which the display control device 10 receives an input operation of giving an instruction to generate a group to which a row object on the screen belongs from the user will be described with reference to FIG. 10.

For example, a case in which the display control device 10 selects any row objects ("equipment data.xlsx", "customer information.xlsx", and "order registration"), subsequently selects group generation menu with a right click, and receives an operation of inputting a group name ("order registration work") on the screen denoted by reference numeral 1001 of FIG. 10 from the user will be described. In this case, the operation management unit 12 specifies the setting content indicated by the operation which is generation of the group to which the selected object with the row label belongs based on the operation setting information (see FIG. 4). Then, the display processing unit 11 adds information denoted by reference numeral 1002 of FIG. 10 (conditions indicating "equipment data.xlsx", "customer information.xlsx", and "order registration" and group name "order registration work") to the group setting table in the display setting information. The display processing unit 11 changes the display state information based on the display setting information to which the above group is added.

For example, based on the display setting information to which the group of "order registration work" is added, the display processing unit 11 groups the row objects of "equipment data.xlsx", "customer information.xlsx", and "order registration" and changes the display state information to which the group name "order registration work" is displayed. Based on the changed display state information, the visualization unit 14 draws the screen in which the selected row objects are grouped, as denoted by reference numeral 1002 of FIG. 10.

When a group is newly generated in a state in which there is no existing group on the screen, the display processing unit 11 is assumed to add a layer of "group" to a pre-designated layer (for example, a first layer) of the layer setting table.

[Deletion of Group]

Figure 11:
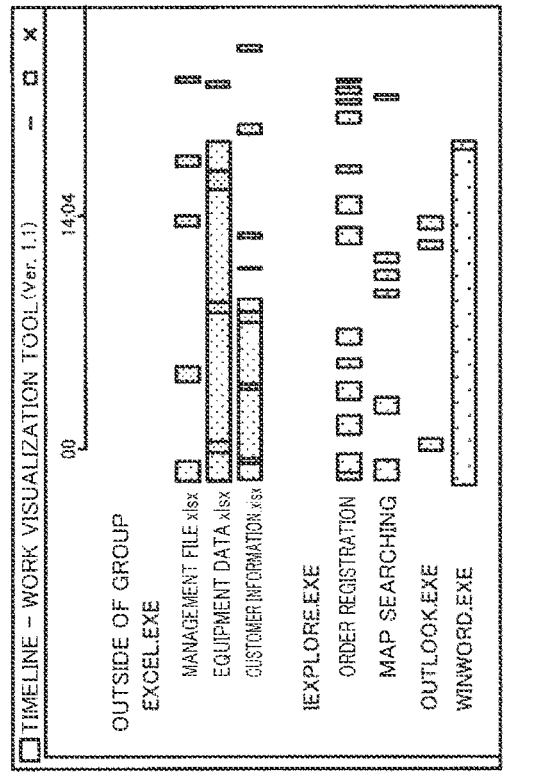
FIG. 11 is a diagram illustrating an example of a screen for deleting a group to which row objects belong.
Figure 11:
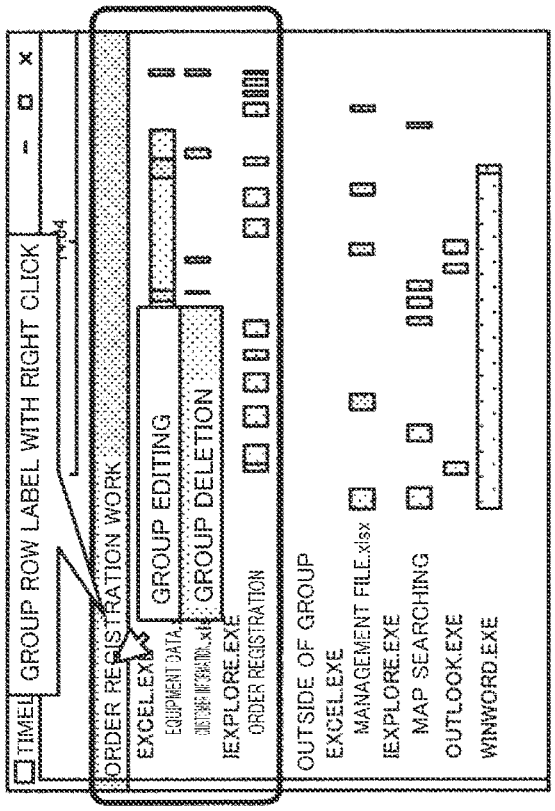

A screen example in a case in which the display control device 10 receives an input operation of giving an instruction to delete a group to which the row objects on the screen belong from the user will be described with reference to FIG. 11. To facilitate description, description of the layer setting table will be omitted in the display setting information in FIGS. 11 to 15, and only the group setting table will be described.

For example, a case in which the display control device 10 selects the row label "order registration work" of the group and subsequently receives selection of "group deletion" in the menu selection with a right click on a screen denoted by reference numeral 1101 of FIG. 11 from the user will be considered. In this case, the operation management unit 12 specifies the setting content indicated by the operation which is deletion of the group indicated by the row label of the selected group based on the operation setting information (see FIG. 4). Then, the display processing unit 11 deletes the information regarding the group of the selected "order registration work" from the group setting table in the display setting information, as illustrated in the lower part of FIG. 11. The display processing unit 11 changes the display state information based on the display setting information in which the information regarding the group of the above "order registration work" is deleted.

For example, based on the display setting information in which the information regarding the group of the above "order registration work" is deleted, the display processing unit 11 changes the display state information to the display state information in which the grouping of "order registration work" is cancelled. Based on the changed display state information, the visualization unit 14 draws a screen on which the grouping of "order registration work" is cancelled, as denoted by reference numeral 1102 of FIG. 11.

[Change in Group Name]

Figure 12:
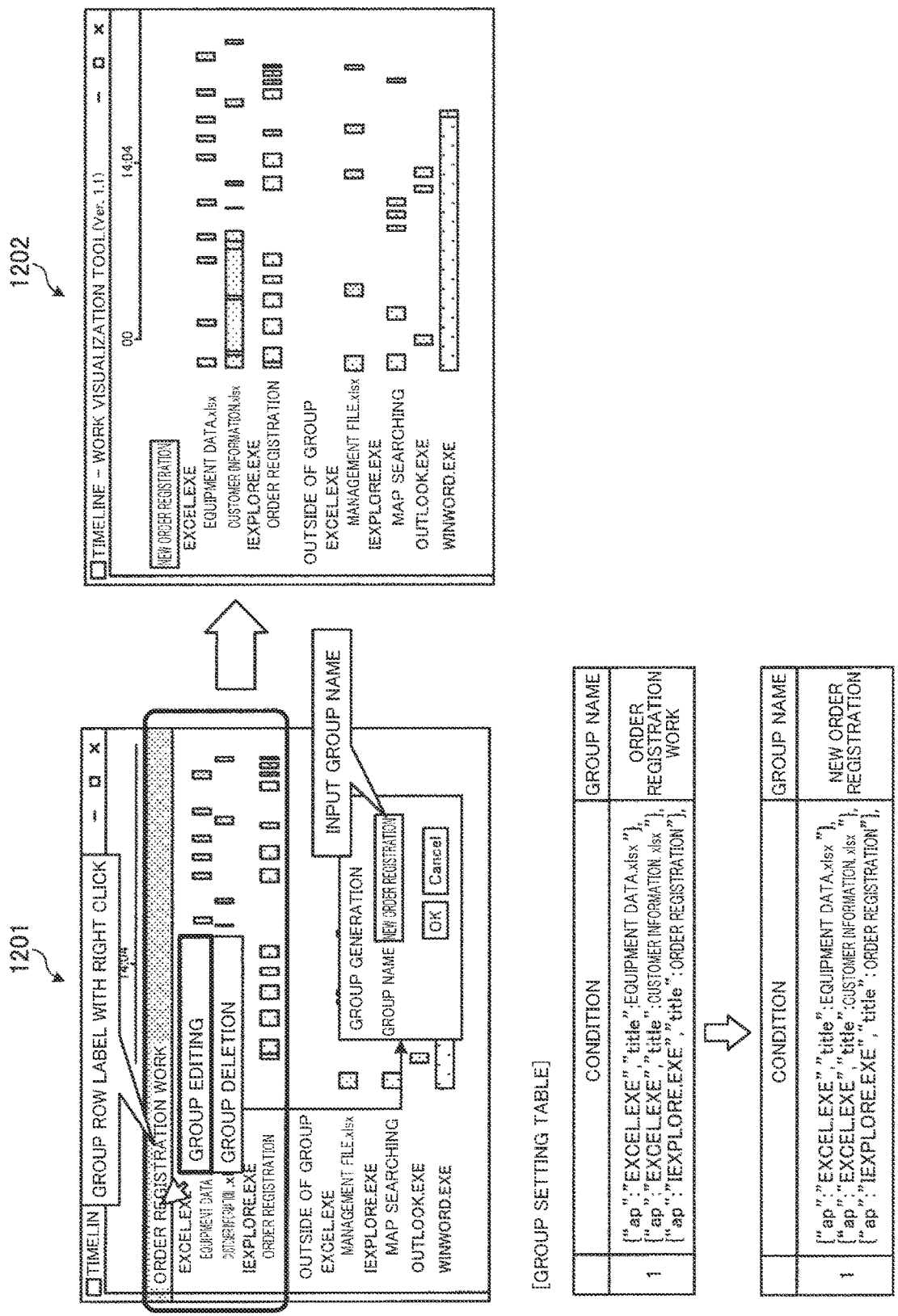
FIG. 12 is a diagram illustrating an example of a screen for changing a group name to which row objects belong.

A screen example in a case in which the display control device 10 receives an input operation of giving an instruction to change a group name to which the row objects on the screen belong from the user will be described with reference to FIG. 12.

For example, a case in which the display control device 10 selects the row label of the group and subsequently receives an input of the group name in "group editing" in the menu selection with a right click on a screen denoted by reference numeral 1201 of FIG. 12 from the user will be considered. In this case, the operation management unit 12 specifies the setting content which is indicated by the operation and is a change of the group name of the selected group based on the operation setting information (see FIG. 4). Then, the display processing unit 11 changes the group name to which the row label belongs in the group setting table from "order registration work" to "new order registration" in the display setting information, for example, as illustrated in the lower part of FIG. 12. The display processing unit 11 changes the display state information based on the display setting information in which the group name is changed. Based on the changed display state information, the visualization unit 14 draws a screen on which the group name to which the row label belongs is changed to "new order registration," as denoted by reference numeral 1202 of FIG. 12.

When the changed group name of a row selected by the user is the same as the existing group name, the display control device 10 may include the row in the existing group.

Figure 13:
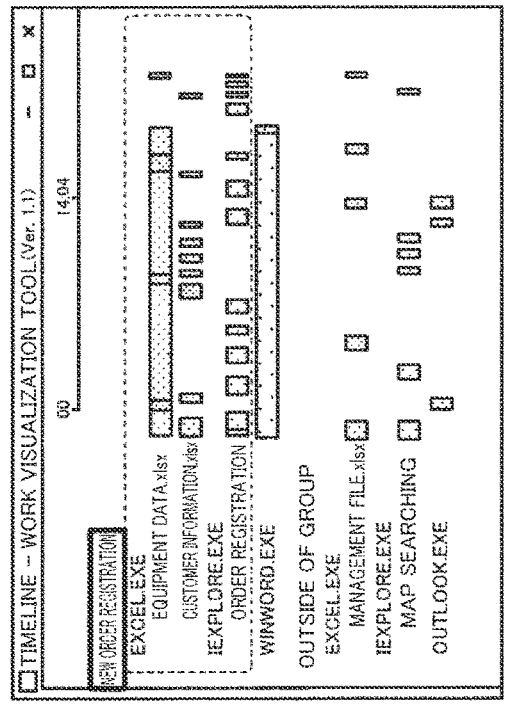
FIG. 13 is a diagram illustrating an example of a screen for changing a group to which row objects belong.
Figure 13:
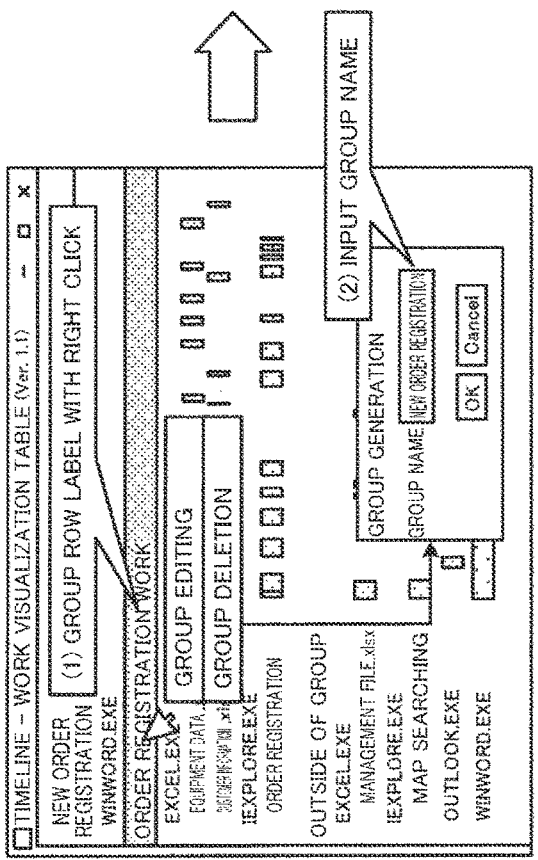

For example, a case in which the display control device 10 selects the row label of the group of "order registration work" on the screen denoted by reference numeral 1301 of FIG. 13 and subsequently receives an input of the group name "new order registration" which is the existing group name in "group editing" of the menu selection with a right click from the user will be considered. In this case, the display processing unit 11 includes the row objects ("equipment data.xlsx", "customer information.xlsx", and "order registration") which were belonging to the group of "order registration work" in the group of "new order registration" in the display setting information, for example, as illustrated in the lower part of FIG. 13. Thereafter, the display processing unit 11 changes the display state information based on the display setting information in which the group name is changed. Based on the changed display state information, the visualization unit 14 draws a screen in which "equipment data.xlsx", "customer information.xlsx", and "order registration" are added as the row objects belonging to the group of "new order registration" as in reference numeral 1302 of FIG. 13.

[Separation from Group]

A screen example in a case in which the display control device 10 receives an operation of giving an instruction to separate a row object selected on the screen from the group to which the row object belongs from the user will be described with reference to FIG. 14.

For example, a case in which the display control device 10 selects the row label in the group "order registration work" and subsequently receives an input of "separation from group" in the menu selection with a right click on a screen denoted by reference numeral 1401 of FIG. 14 from the user will be considered. In this case, the operation management unit 12 specifies the setting content which is indicated by the operation and is the separation of the selected row from the group to which the row belongs based on the operation setting information (see FIG. 4).

Figure 14:
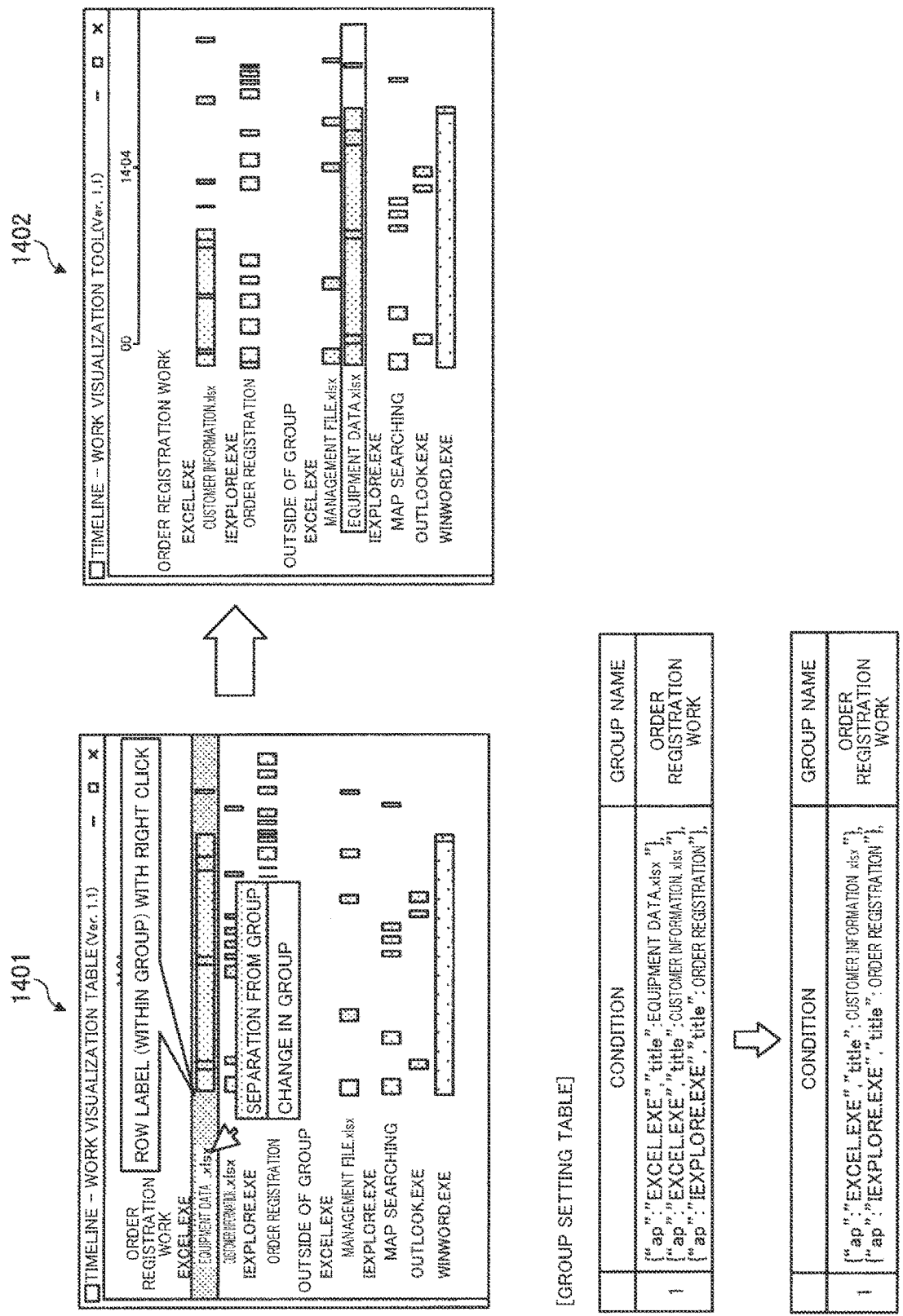
FIG. 14 is a diagram illustrating an example of a screen shown when a row object is separated from a group to which the row object belongs.

Thereafter, the display processing unit 11 deletes the information of the selected row object "equipment data.xlsx" from the condition of "order registration work" in the group setting table of the display setting information, for example, as illustrated in the lower part of FIG. 14. Then, the display processing unit 11 changes the display state information based on the display setting information in which the information of the row object "equipment data.xlsx" is deleted. Based on the changed display state information, the visualization unit 14 draws a screen in which the selected row object "equipment data.xlsx" is moved to "outside of group" as in reference numeral 1402 of FIG. 14.

[Change in Belonging Group]

A screen example in a case in which the display control device 10 receives an operation of giving an instruction to separate a row object selected on the screen from the group to which the row object belongs and move the row object to another group from the user will be described with reference to FIG. 15.

For example, a case in which the display control device 10 selects the row label in the group of "order registration work" and subsequently receives an input of the group name "equipment management work" in "change in group" in the menu selection with a right click on a screen denoted by reference numeral 1501 of FIG. 15 from the user will be considered. In this case, the operation management unit 12 specifies the setting content which is indicated by the operation and is a change of the group to which the selected row object belongs based on the operation setting information (see FIG. 4).

Figure 15:
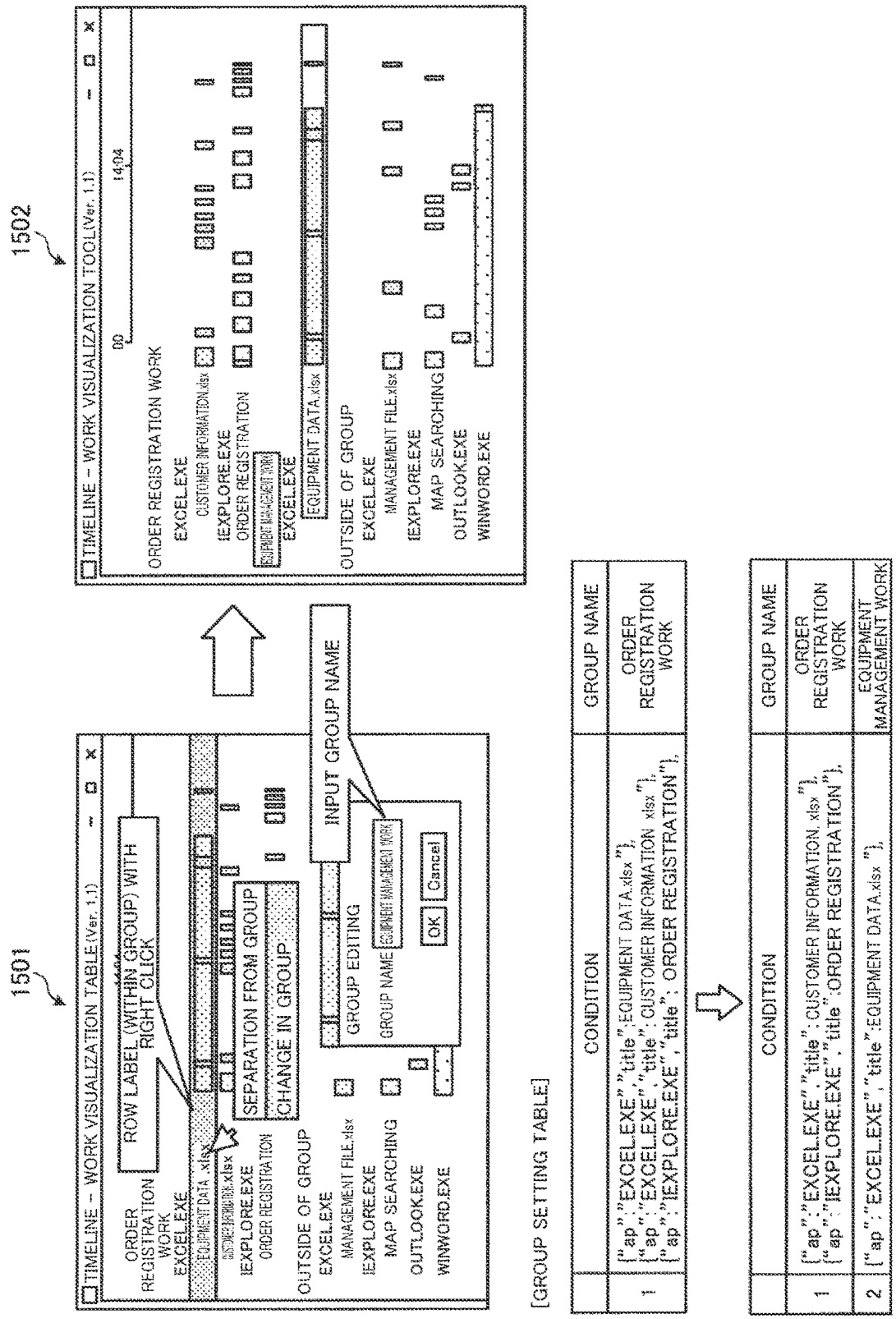
FIG. 15 is a diagram illustrating an example of a screen for changing a group to which row objects belong.

Thereafter, the display processing unit 11 deletes the information of the selected row object "equipment data.xlsx" from the condition of "order registration work" in the group setting table of the display setting information, for example, as illustrated in the lower part of FIG. 15. Then, the display processing unit 11 adds the group of "equipment management work" in the group setting table and describes the information of the row object "equipment data.xlsx" as the condition of the group. Thereafter, the display processing unit 11 changes the display state information based on the changed display setting information. Based on the changed display state information, the visualization unit 14 draws a screen in which the selected row object "equipment data.xlsx" is moved to the group of "equipment management work" as in reference numeral 1502 of FIG. 15.

In the above-described display control device 10, the user can change the group and each row object layer included in the timeline by trial and error while viewing a display result of each row object included in the timeline on the screen in accordance with the viewpoints when the user performs work analysis. As a result, the user can easily perform work analysis from various viewpoints.

In the foregoing embodiment, the example in which the key which is the layer of each row object is the application name or the like used in the user name, the customer ID, the window title of the operation target, and the window in the operation has been described, but the present invention is not limited thereto. For example, "period" such as a day, a week, or a month may be used as the key which is the layer of each object.

For example, when "user name", "customer ID", and "period" is used as the layers of the row objects, the user (the analyzer) can use the display control device 10 to hierarchize the row objects for each "customer ID" and subsequently hierarchize the row objects for each "user" and can check a flow of work in which a plurality of users are involved. The user (the analyzer) can use the display control device 10 to hierarchize the row objects for each "user" and subsequently hierarchize the row objects for each "period" and check a work tendency and periodicity of each user. In this way, the user (the analyzer) can carry out an appropriate grouping method while viewing display of the row objects (the time line) since the user can flexibly change the layers based on various viewpoints specific to work analysis.

[Program]

A program that realizes the functions of the display control device 10 described in the foregoing embodiment can be installed to be mounted on a desired information processing device (a computer). For example, by causing the information processing device to execute the program provided as package software or online software, it is possible to cause the information processing device to function as the display control device 10. The information processing device mentioned herein includes a desktop or laptop personal computer, a rack-mounted server computer, and the like. In addition, a mobile communication terminal such as a smartphone, a mobile phone, or a personal handyphone system (PHS) and personal digital assistants (PDAs) are included in a category of the information processing device. The display control device 10 may be mounted on a cloud server.

Figure 16:
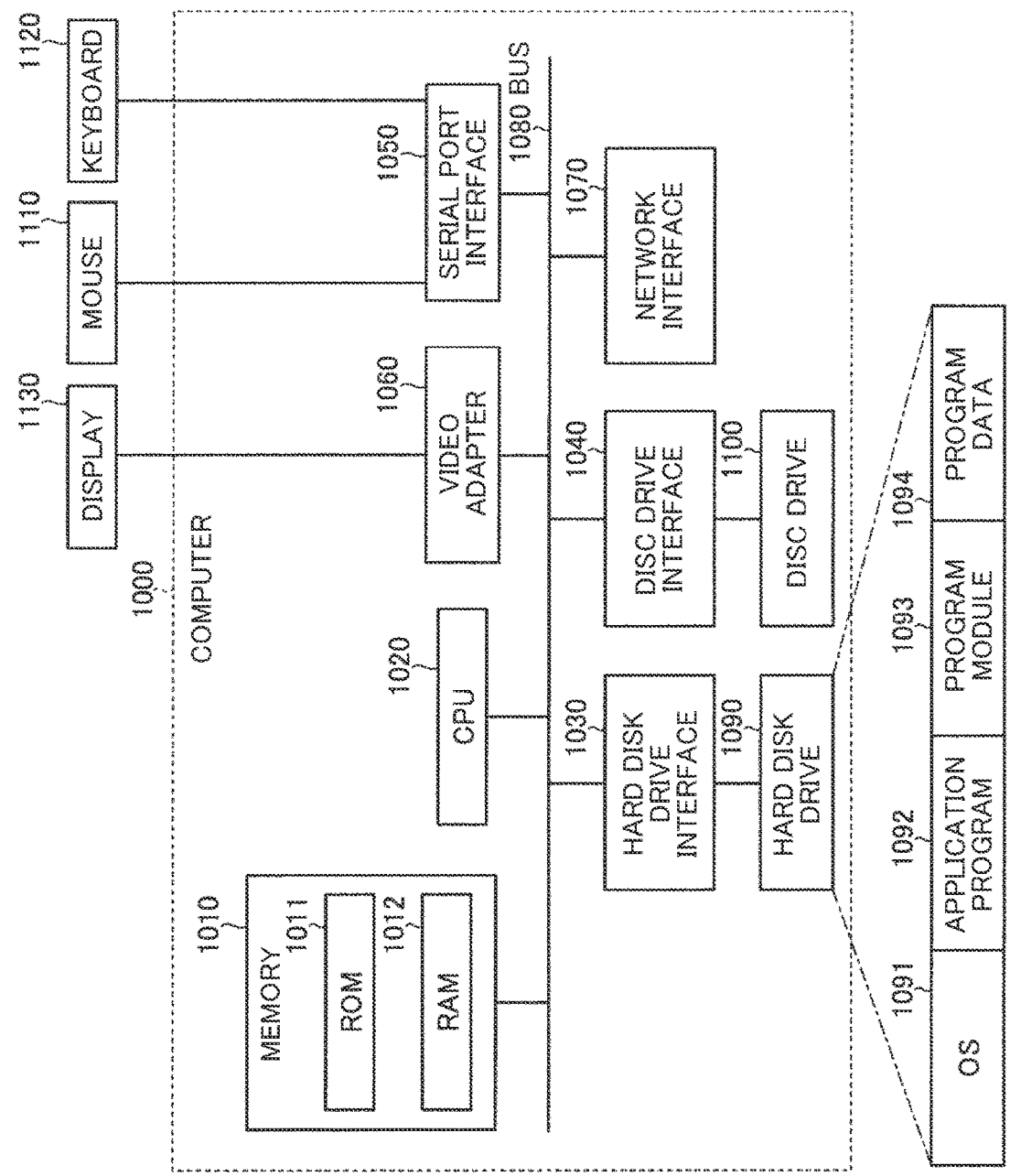
FIG. 16 is a diagram illustrating an example of a computer that executes a display control program.

An example of a computer that executes the foregoing program (a display control program) will be described with reference to FIG. 16. As illustrated in FIG. 16, a computer 1000 includes, for example, a memory 1010, a CPU 1020, a hard disk drive interface 1030, a disc drive interface 1040, a serial port interface 1050, a video adapter 1060, and a network interface 1070. These units are connected by a bus 1080.

The memory 1010 includes a read-only memory (ROM) 1011 and a random access memory (RAM) 1012. The ROM 1011 stores, for example, a boot program such as a basic input output system (BIOS). The hard disk drive interface 1030 is connected to a hard disk drive 1090. The disc drive interface 1040 is connected to a disc drive 1100. For example, a detachable mounted storage medium such as a magnetic disk or an optical disc is inserted into the disc drive 1100. For example, a mouse 1110 and a keyboard 1120 are connected to the serial port interface 1050. For example, a display 1130 is connected to the video adapter 1060.

Here, as illustrated in FIG. 16, the hard disk drive 1090 stores, for example, an OS 1091, an application program 1092, a program module 1093, and program data 1094. The display setting information, the display state information, and the operation setting information described in the foregoing embodiment are stored in, for example, the hard disk drive 1090 or the memory 1010.

The CPU 1020 reads the program module 1093 or the program data 1094 stored in the hard disk drive 1090 to the RAM 1012 as necessary to execute the above-described sequences.

The program module 1093 or the program data 1094 related to the foregoing display control program are not limited to a case in which the program module 1093 or the program data 1094 are stored in the hard disk drive 1090. For example, the program module 1093 or the program data 1094 may be stored in a detachable mounted storage medium to be read by the CPU 1020 via the disc drive 1100 or the like.

Alternatively, the program module 1093 or the program data 1094 related to the foregoing program may be stored in another computer connected via a network of LAN or a wide area network (WAN) to be read by the CPU 1020 via the network interface 1070.

REFERENCE SIGNS LIST

10 Display control device
11 Display processing unit
12 Operation management unit
13 Display state management unit
14 Virtualization unit

The invention claimed is:

1. A display control device comprising:
a non-transitory computer readable medium configured to store i) display setting information indicating setting information of a layer structure of display objects on a terminal screen and setting information of a group to which the display objects belong, ii) operation setting information which is indicated by an operation event which is a combination of an operation target and operation content on a screen and indicates setting content related to the layer structure or a group for each combination of the operation target and the operation content, and iii) display state information indicating a disposition position of each of the display objects on the screen;

a memory; and a processor coupled to the memory and programmed to execute a process comprising:

receiving an operation event on a display object on the screen;

specifying the setting content related to the layer structure or the group indicated by the operation event with reference to the display state information and the operation setting information;

determining a change in the display setting information based on the specified setting content;

determining whether the change in the display setting information is a change in the layer structure or a change in setting information of the group;

in response to determining that the change is a change in the layer structure of the display setting information, reconstructing the display state information using a new layer structure in the changed display setting information;

in response to determining that the change is a change in the setting information of the group, partially updating the display state information using the change in the setting information of the group, wherein the operation event indicating the change in the setting information of the group comprises i) selecting a plurality of display objects on the screen and ii) inputting a group name for a new group, and wherein the change in the setting information of the group comprises generating the new group for the plurality of display objects selected in the operation event;

generating updated display state information in which the layer structure of the display objects or the group to which the display objects belong is changed based on the change in the display setting information; and performing screen display based on the updated display state information.

2. The display control device according to claim 1, wherein the display object is a row object included in a timeline.

3. The display control device according to claim 1, wherein the setting content of the layer structure is at least one of switch, addition, deletion, expansion, and contraction of a layer.

4. The display control device according to claim 1, wherein the setting content of the group is at least one of generation, deletion, and a change in the group, separation of the group from an existing group, and movement of the group to another group.

5. A display control method performed by a display control device including a storage medium that stores i) display setting information indicating setting information of a layer structure of display objects on a terminal screen and setting information of a group to which the display objects belong, ii) operation setting information which is indicated by an operation event which is a combination of an operation target and operation content on a screen and indicates setting content related to the layer structure or a group for each combination of the operation target and the operation content, and iii) display state information indicating a disposition position of each of the display objects on the screen, the method comprising:

receiving an operation event on a display object on the screen;

specifying the setting content related to the layer structure or the group indicated by the operation event with reference to the display state information and the operation setting information;

determining a change in the display setting information based on the specified setting content;

determining whether the change in the display setting information is a change in the layer structure or a change in setting information of the group;

in response to determining that the change is a change in the layer structure of the display setting information, reconstructing the display state information using a new layer structure in the changed display setting information;

in response to determining that the change is a change in the setting information of the group, partially updating the display state information using the change in the setting information of the group, wherein the operation event indicating the change in the setting information of the group comprises i) selecting a plurality of display objects on the screen and ii) inputting a group name for a new group, and wherein the change in the setting information of the group comprises generating the new group for the plurality of display objects selected in the operation event;

generating updated display state information in which the layer structure of the display objects or the group to which the display objects belong is changed based on the change in the display setting information; and performing screen display based on the updated display state information.

6. A non-transitory computer-readable recording medium storing therein a display control program that causes a computer to execute a process comprising:

storing, by a storage medium, i) display setting information indicating setting information of a layer structure of display objects on a terminal screen and setting information of a group to which the display objects belong, ii) operation setting information which is indicated by an operation event which is a combination of an operation target and operation content on a screen and indicates setting content related to the layer structure or a group for each combination of the operation target and the operation content, and iii) display state information indicating a disposition position of each of the display objects on the screen;

receiving an operation event on a display object on the screen;

specifying the setting content related to the layer structure or the group indicated by the operation event with reference to the display state information and the operation setting information;

determining a change in the display setting information based on the specified setting content;

determining whether the change in the display setting information is a change in the layer structure or a change in setting information of the group;

in response to determining that the change is a change in the layer structure of the display setting information, reconstructing the display state information using a new layer structure in the changed display setting information;

in response to determining that the change is a change in the setting information of the group, partially updating the display state information using the change in the setting information of the group, wherein the operation event indicating the change in the setting information of the group comprises i) selecting a plurality of display objects on the screen and ii) inputting a group name for a new group, and wherein the change in the setting information of the group comprises generating the new group for the plurality of display objects selected in the operation event;

generating updated display state information in which the layer structure of the display objects or the group to which the display objects belong is changed based on the change in the display setting information; and performing screen display based on the updated display state information.

* * * * *